(12) United States Patent
Tu et al.

(10) Patent No.: US 11,269,733 B2
(45) Date of Patent: Mar. 8, 2022

(54) SYNTHETIC FULL BACKUPS AND DEDUPLICATION BACKUP STORAGE WITH LANDING ZONE

(71) Applicant: Exagrid Systems, Inc., Marlborough, MA (US)

(72) Inventors: Shu-Tsui Tu, Westborough, MA (US); Thomas J. Gillispie, Acton, MA (US); Adrian T. VanderSpek, Worcester, MA (US)

(73) Assignee: Exagrid Systems, Inc., Marlborough, MA (US)

( * ) Notice: Subject to any disclaimer, the term of this patent is extended or adjusted under 35 U.S.C. 154(b) by 124 days.

(21) Appl. No.: 16/677,373

(22) Filed: Nov. 7, 2019

(65) Prior Publication Data

US 2020/0151062 A1    May 14, 2020

Related U.S. Application Data

(60) Provisional application No. 62/760,423, filed on Nov. 13, 2018.

(51) Int. Cl.
*G06F 11/14* (2006.01)
*G06F 16/174* (2019.01)

(52) U.S. Cl.
CPC ...... *G06F 11/1453* (2013.01); *G06F 11/1451* (2013.01); *G06F 16/1748* (2019.01); *G06F 2201/815* (2013.01)

(58) Field of Classification Search
CPC ............. G06F 11/1469; G06F 11/1453; G06F 16/1748; G06F 11/1451; G06F 2201/815; G06F 11/1461; G06F 16/1756; G06F 11/1446; G06F 11/1448; G06F 11/1458; G06F 2201/84; G06F 16/113
See application file for complete search history.

(56) References Cited

U.S. PATENT DOCUMENTS 7,694,088 B1 *  4/2010  Bromley ............. G06F 11/1458
                                                    711/162
8,825,972 B1 *  9/2014  Tsaur .................. G06F 11/1453
                                                    711/162

(Continued)

FOREIGN PATENT DOCUMENTS

EP    3 098 714 A1    11/2016

OTHER PUBLICATIONS

Extended European Search Report dated Apr. 6, 2020, for EP Application No. 19208937.3, 7 pages.

*Primary Examiner* — David T. Brooks
(74) *Attorney, Agent, or Firm* — Mintz Levin Cohn Ferris Glovsky and Popeo, P.C.

(57) ABSTRACT

A method, a system, and a computer program product for executing synthetic backup processes and deduplication backup storage with landing zone. A synthetic backup of a data file is received. A partial re-synthesis of the synthetic backup of the data file is performed. A total size of the partial re-synthesized backup of the data file and the received synthetic backup is determined. A size of a complete re-synthesis of the synthetic backup of the data file is computed. The complete re-synthesis of the synthetic backup of the data file is performed when the determined total size exceeds the computed size of the complete re-synthesis of the synthetic backup of the data file.

39 Claims, 12 Drawing Sheets

(56) References Cited

U.S. PATENT DOCUMENTS

| | | | | |
|---|---|---|---|---|
| 8,904,125 B1* | 12/2014 | Eiling | ............... | G06F 11/1451 |
| | | | | 711/162 |
| 8,943,281 B1* | 1/2015 | Stringham | .......... | G06F 11/1458 |
| | | | | 711/162 |
| 9,152,507 B1* | 10/2015 | Bushman | ............ | G06F 11/1451 |
| 9,298,561 B1* | 3/2016 | Sawhney | ............ | G06F 11/1469 |
| 9,633,065 B2* | 4/2017 | Bachu | ................... | G06F 21/602 |
| 9,703,644 B1* | 7/2017 | Jagannatha | ......... | G06F 11/1435 |
| 9,785,643 B1* | 10/2017 | Patil | .................... | G06F 11/1453 |
| 10,002,050 B1* | 6/2018 | Zhang | ................ | G06F 11/1453 |
| 2011/0161297 A1 | 6/2011 | Parab | | |
| 2011/0218966 A1* | 9/2011 | Barnes | ............... | G06F 11/1004 |
| | | | | 707/645 |
| 2012/0078855 A1* | 3/2012 | Beatty | ................. | G06F 11/1469 |
| | | | | 707/676 |
| 2012/0143835 A1* | 6/2012 | Aronovich | ......... | G06F 16/2255 |
| | | | | 707/696 |
| 2012/0221525 A1* | 8/2012 | Gold | .................. | G06F 11/1458 |
| | | | | 707/644 |
| 2014/0164330 A1* | 6/2014 | Barnes | ............... | G06F 11/1451 |
| | | | | 707/646 |
| 2015/0370645 A1* | 12/2015 | Dhanalakoti | ....... | G06F 11/1461 |
| | | | | 707/646 |
| 2016/0314046 A1 | 10/2016 | Kumarasamy | | |

\* cited by examiner

SYNTHETIC FULL BACKUPS AND DEDUPLICATION BACKUP STORAGE WITH LANDING ZONE

CROSS-REFERENCE TO RELATED APPLICATIONS

The present application claims priority to U.S. Provisional Patent Appl. No. 62/760,423 to Tu et al., filed Nov. 13, 2018 and entitled "Synthetic Full Backups and Deduplication Backup Storage With Landing Zone," and incorporates its disclosure herein in its entirety.

TECHNICAL FIELD

This disclosure relates generally to data processing and, in particular, to data processing and, in particular, to synthetic backup processes and deduplication backup storage with landing zone.

BACKGROUND

A synthetic full backup file image contains a recipe for how to recreate a traditional full backup image from of a series of INCLUDE references for data that are contained in previously received backup files, as well as NEW references for unique bytes of backup data. While synthetic full backups may greatly reduce the time it takes to complete a periodic full backup operation, it comes with the following negative tradeoffs. Some of these include slower restores and tape copies due to disk fragmentation, and increased processing time to resolve indirect pointer chunks of data from multiple incremental and synthetic full backup images. Additionally, the processes are impacted by a difficulty in scaling the metadata of potentially billions of indexed entries to track all of the unique and identical parts of multiple incremental and synthetic full backup images. A coordinated set of processing operations between the backup server and the deduplication system is needed to optimally manage the unique workloads of synthetic full backups.

SUMMARY

In some implementations, the current subject matter relates to a computer-implemented method. The method can include receiving a synthetic backup of a data file, performing a partial re-synthesis of the synthetic backup of the data file, determining a total size of the partial re-synthesized backup of the data file and the received synthetic backup, computing a size of a complete re-synthesis of the synthetic backup of the data file, and performing the complete re-synthesis of the synthetic backup of the data file when the determined total size exceeds the computed size of the complete re-synthesis of the synthetic backup of the data file.

In some implementations, the current subject matter can include one or more of the following optional features. The synthetic backup of the data file can include a plurality of virtual fragments. Each virtual fragment in the plurality of virtual segments can include at least one instruction in a plurality of instructions identifying a physical data fragment for inclusion in at least one of the partial re-synthesized backup of the data file and the complete re-synthesized backup of the data file. The instruction can include at least one of the following: a first instruction identifying a physical segment from a previous backup of the data file for inclusion and a second instruction identifying a physical data segment that has not been backed-up previously.

In some implementations, the method can further include, using the plurality of instructions in the plurality of virtual fragments, combining physical data segments identified by the plurality of instructions, and generating, based on the combined physical data segments, at least one of the partial re-synthesized backup of the data file and the complete re-synthesized backup of the data file.

In some implementations, the partial re-synthesized backup of the data file can be generated based on a combination of at least one incremental backup performed after the received synthetic backup of the data file and another synthetic full backup performed after the at least one incremental backup.

In some implementations, the complete re-synthesized backup of the data file can be generated based on a combination of the received synthetic backup of the data file, at least one incremental backup performed after the received synthetic backup of the data file and another synthetic full backup performed after the at least one incremental backup. The received synthetic backup can include at least one of the following: a full backup of the data file and previous complete re-synthesized backup of the data file.

In some implementations, the method can include preventing deduplication of at least one virtual fragment. The method can also include storing the complete re-synthesis of the synthetic backup of the data file in at least one memory location of a deduplication backup storage system.

There is a desire on the part of backup administrators to employ an accelerated form of full backups called synthetic full backups in order to greatly reduce the time it takes to perform full backups on a periodic (weekly, monthly) basis.

A deduplication backup storage system (DBSS) receives full, incremental and synthetic full backups from a backup application. The invention of this patent describes the need for advanced DBSS data management capabilities in order to optimally manage traditional full and incremental backups as well as synthetic full backups.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
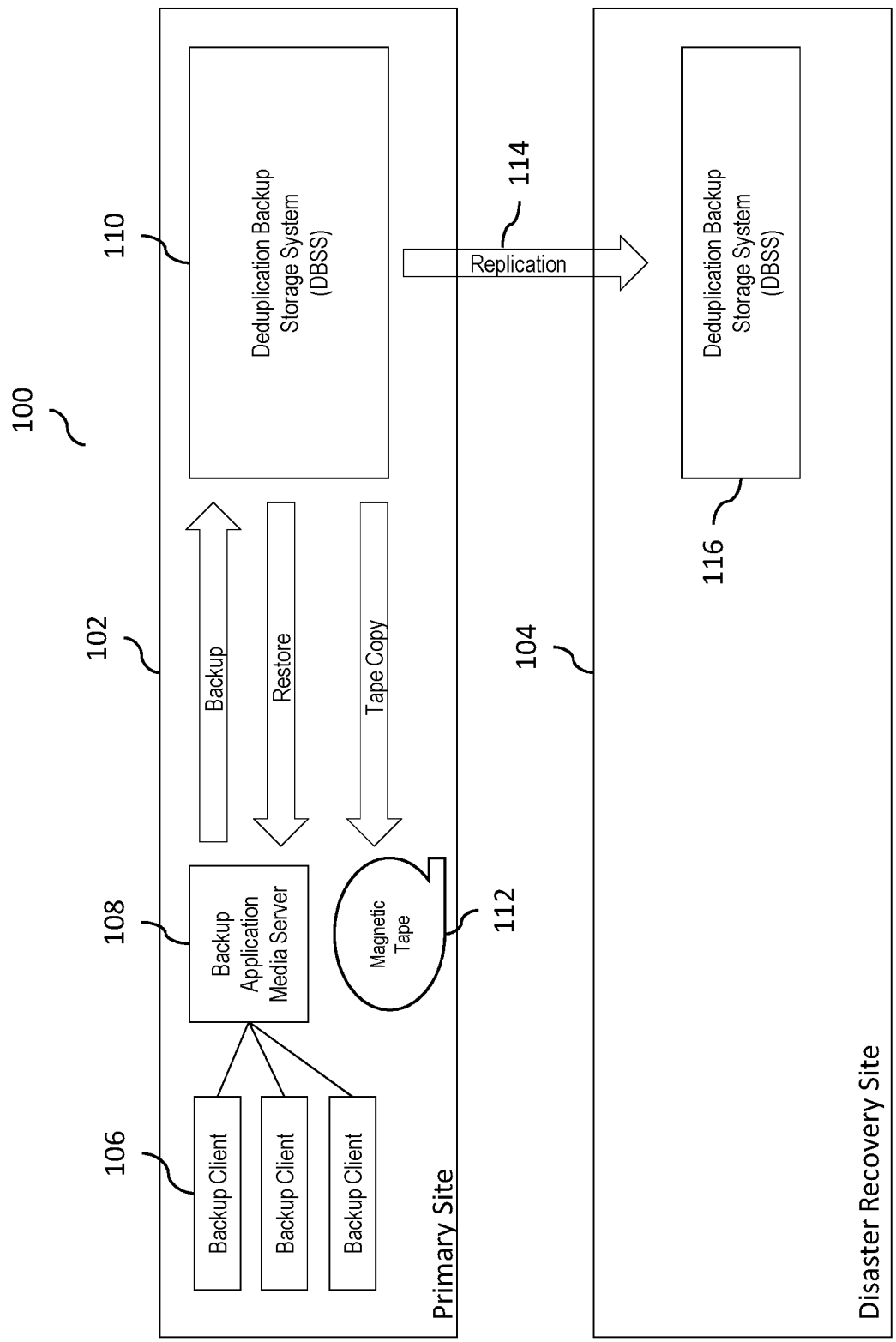
FIG. 1 illustrates an exemplary system for backup and/or disaster recovery of data, according to some implementations of the current subject matter.

FIG. 1 illustrates an exemplary system 100 for backup and/or disaster recovery of data, according to some implementations of the current subject matter. The system 100 can include a primary backup site 102 communicatively coupled to a secondary and/or a disaster recovery site 104. The sites 102 and 104 can be communicatively coupled via a connection 114. The sites 102, 104 can include one or more processing components, memory components, servers, and/or any combination of hardware and/or software. The communication connection 114 can include any type of wired and/or wireless connection (e.g., metropolitan area network (MAN), local area network (LAN), wide area network (WAN), virtual local area network (VLAN), Wi-Fi, etc.). As can be understood, designations of primary site and secondary site are for illustrative purposes only and are not intended to limit the scope of the present application.

The primary site 102 can include one or more backup client(s) 106, backup application media server(s) 108, magnet tape(s) 112, and a deduplication backup storage system (DBSS) 110. The backup application media server(s) 108 can be communicatively coupled to backup client(s) 106 as well as the DBSS 110. The backup client(s) 106 can be configured to transmit data to the server 108 for backup. The server 108 can be configured to transmit the data that it received from the client(s) for deduplication by the DBSS 110. In some implementations, the server 108 can be configured to request data to be restored, whereby the DBSS 110 can be configured to transmit data requested by the server 108 to be restored. Further, the DBSS 110 can also be configured to generate a tape copy and transmit it for storage in a memory, e.g., magnetic tape 112. Further, the DBSS 110 can also be configured to perform replication of the deduplicated data to a deduplication backup storage system 116 at the secondary site 104 for storage.

In some implementations, at the primary site 102, the backup application media server 108 can be configured to collect data from one or more backup clients 106 and transmit the collected data to a primary site DBSS 110. These processes can be performed as part of a periodic backup operation. As stated above, the DBSS 110 can provide backup as well as restore capabilities. For example, when a backup client 106 requests a restore operation (e.g., because data was lost, corrupted, etc.), the DBSS 110 can receive a restore request from the backup application medial server 108, determine which data was requested, and provide the restore data to the backup application media server 108, which, in turn, can transmit/update the backup client 106 with the restored data.

In the event of a complete loss of the primary site 102's servers, primary storage and networking, the disaster recovery or secondary site 104 can be used to retrieve data that was lost. A site disaster recovery scheme can be implemented and can provide a process for restoring systems and storage from that loss. Restoring lost data can be implemented in one or more of the following ways. The secondary site 104 can include one or more magnetic tapes (not shown in FIG. 1), which are similar to the magnetic tape 112 at the primary site 102. The magnetic tape(s) at the secondary site 104 can be configured to receive and store backup data that was transmitted by the backup application media server 108 to the DBSS 110. In some implementations, the magnetic tapes, once written, can be physically transported to a geographically distant storage facility so that they can be used in the event of a primary site disaster.

Alternatively, the above process can be accomplished by replicating data received by the DBSS 110 at the primary site 102 and transmitting the replicated data via the link 114 from DBSS 110 to DBSS 116 at the secondary site 104. The secondary site 104, including its DBSS 116, can be deployed at a geographically remote location from the site 102 (e.g., hosting facility, alternate corporate data center, etc.). Prior to transmission of data to the secondary site 104, the DBSS 110 can deduplicate the data and then transmit it to the DBSS 116 at the secondary site 104.

Figure 2:
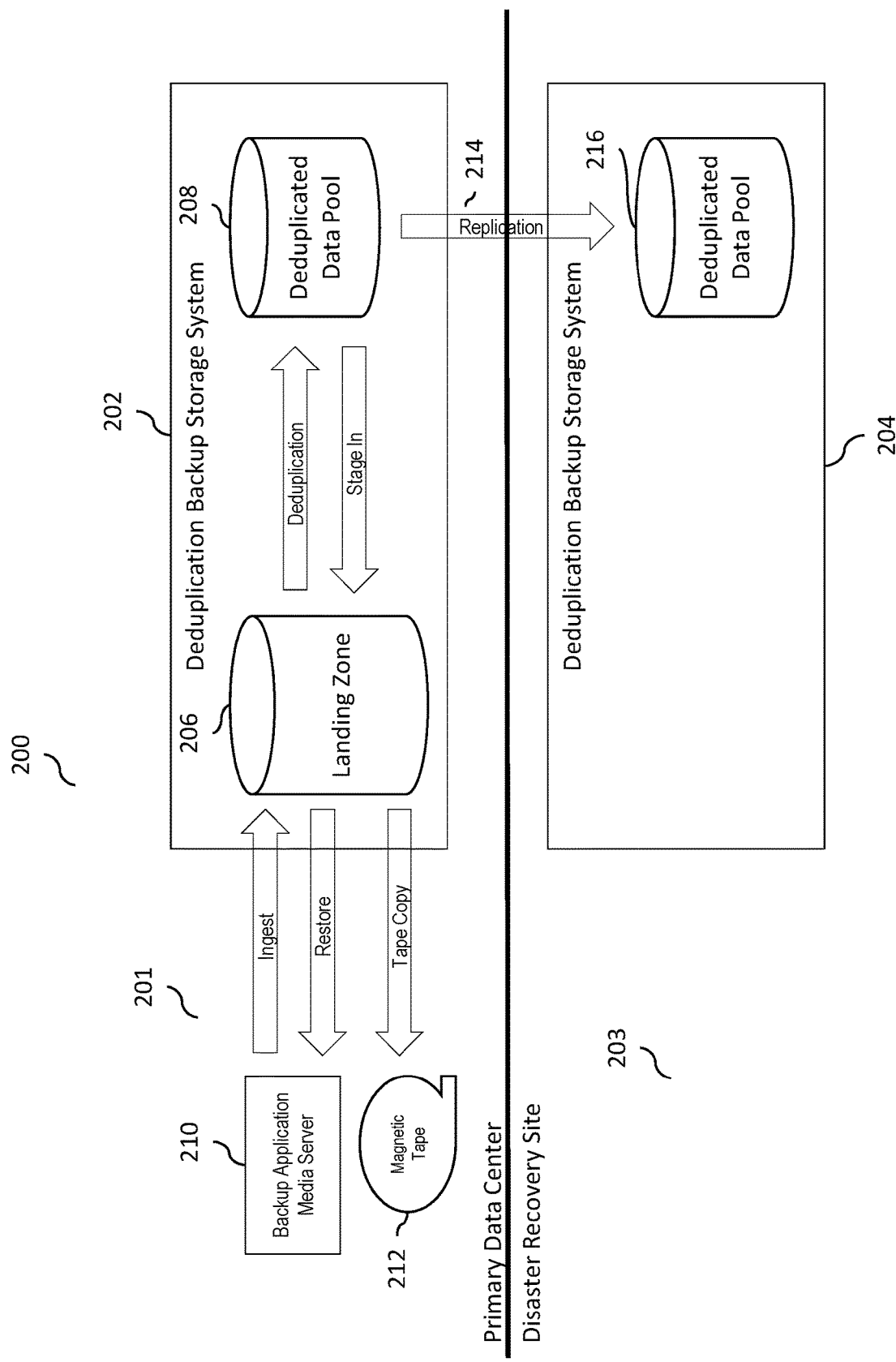
FIG. 2 illustrates an exemplary deduplication backup storage system (DBSS) of a backup system, according to some implementations of the current subject matter.

FIG. 2 illustrates an exemplary deduplication backup storage system (DBSS) 202 of a backup system 200, according to some implementations of the current subject matter. The backup system 200 can include a primary site (e.g., a primary data center) 201 communicatively coupled to a secondary site (e.g., a disaster recovery site) 203. The primary site 201 can include the DBSS 202, a backup application media server 210 and a magnet tape 212. The secondary site 203 can include a DBSS 204. The DBSS 202 can be similar to the DBSS 110 and DBSS 204 can be similar to DBSS 116 shown in FIG. 1.

As shown in FIG. 2, the DBSS 202 can include a landing zone memory or storage 206 and a deduplication data pool memory or storage 208. The landing zone 206 can be a disk-based storage area that can be configured to receive backup data from the backup application media server 210 as part of an "ingest" operation (e.g., receive backup data from the server 210 and store it (e.g., temporarily, permanently, and/or both)). Data in the landing zone 206 can be stored as it was ingested (e.g., as transmitted from the server 210). The data in the landing zone 206 can be later deduplicated and stored in the deduplicated data pool 208 of the DBSS 202. In some implementations, the landing zone 206's capacity can have a size that is appropriate to create a "data cache" of the most recently ingested data backups that are transmitted from the server 210. This landing zone cache can be further configured to accelerate backup client "restore" operations as well as the process of efficiently creating one or more magnetic "tape copies" for disaster recovery, as shown in FIG. 2. In some exemplary, non-limiting, implementations, an approximate capacity of the landing zone 206 can be 63 terabytes (TB) of data, and an approximate capacity of the deduplicated data pool 208 can also be 63 TB. As can be understood, any other sizes of one or both zone 206 and pool 208 are possible.

Conventional inline deduplication systems do not have a landing zone of storage space. Such systems immediately deduplicate and store data during the backup ingest period. This slows down the backup ingest operation and renders the backup data in a fragmented deduplicated format that dramatically reduces future backup client restore requests and makes tape copies equally slow and inefficient. The current subject matter system is advantageous over the existing systems.

Referring back to FIG. 2, the landing zone 206 can be configured to transmit the ingested data for deduplication and storage at the deduplicated data pool storage 208. This will ensure that all backup data ingested into the landing zone 206 is deduplicated, which will eliminate redundant bytes of backup data, and that deduplicated data is stored in the deduplicated data pool 208. The landing zone 206 can be configured to store ingested data for a predetermined period of time before transmitting the data for deduplication. For example, the oldest ingested data can be transmitted for deduplication first and the newest or recently ingested backup data can be transmitted for deduplication last. In some implementations, the landing zone 206 can be configured to transmit ingested backup data (e.g., oldest ingested backup data) for deduplication upon detecting receipt of a newly ingested backup data.

In some implementations, the deduplicated data pool 208 can be configured to store deduplicated backup data that can correspond to days, weeks, months, years (or any other period of time) of backup data. Further, in some exemplary implementations, the deduplicated data can be stored for a predetermined period of time, after expiration of which, the data can be moved to a different storage location, deleted, purged, and/or any other action can be taken on the stored data. The deduplicated data pool 208 can be configured to store the deduplicated data in a storage space efficient form.

It is important to minimize the time it takes to complete backup operations, because backup operations can negatively impact the performance of production servers, networking and primary storage systems. Within the DBSS, the deduplication operation is a very compute and storage I/O intensive operation. If deduplication operations were scheduled to run at the same time as backup data is being ingested from the backup application media server, the performance of the ingest operation can drop significantly, thereby lengthening the time (backup window) it takes to perform a backup operation. To ensure that the backup window is not negatively impacted by the DBSS deduplication operation, the DBSS 202 can be configured to execute an adaptive deduplication scheme that only executes deduplication operations during periods when the rate of backup ingestion is very low (e.g., no backup data being transmitted by the server 210, rate of transmission of new data for backup is below a predetermined threshold, etc.).

In some implementations, all data in the landing zone 206 can be deduplicated and stored in the deduplicated data pool 208 at an earliest opportunity. The most recent backups can be retained in the landing zone 206 in order to accelerate potential backup client restore operations and tape copies. When new backup data is transmitted to the DBSS landing zone 206, the storage space in the landing zone 206 must be made available for storage of the new backup data. As a cache of most recent backups, the DBSS 202 can determined one or more portions of data (e.g., files) to "stage out", i.e., transmit for deduplication and storage in the pool 208. As stated above, the candidates can be oldest files in the landing zone 206 that were already deduplicated and/or protected/ stored for a predetermined period of time (e.g., hours, days, weeks, etc., prior to receipt of the new backup data). In some implementations, the landing zone 206 can be configured to perform "staging out" upon detection that capacity of the landing zone 206 has reached a predetermined threshold (e.g., 50%, 75%, 90%, 95%, etc.). In some exemplary implementations, an exception to the rule of "evict oldest file first" can be a "soft-pin" function, which can allow files that are older than a predetermined age of data that is typically stored in the landing zone 206 prior to "eviction" to be retained in the landing zone until the soft-pin attribute is programmatically removed. For example, this can include a data that may need to be accessed quickly without waiting for it to be restored and transmitted to the backup application media server 210 and/or the requesting user/application. The "soft-pin" can be a special identifier/tag/etc. that can be stored with the data (e.g., injected into the data, stored in a header associated with the data, etc.) to prevent it from being deduplicated and transmitted for storage by the pool 208. The DBSS 202 can recognize the identifier/tag/etc. and not perform the deduplication/staging out operations.

In some implementations, a stage-in request can be transmitted to the deduplicated data pool 208 when a restore request is generated by a backup client (not shown in FIG. 2) and the requested data is not cached in the landing zone 206. In the event of a stage-in operation, deduplicated data from the deduplicated data pool 208 must be "rehydrated" into its original form before transmitting it onto the backup application media server 210 via the landing zone 206 and then to the client. Rehydration can refer to obtaining a specific version of a data file by un-delta-compressing one or more versions of the data file that may precede the requested specific version and combining the un-delta-compressed versions to generate a full specific version of the data file that was requested.

For deployments that include a disaster recovery site 203's DBSS system 204, deduplicated data in the deduplicated data pool 208 can be replicated to that offsite DBSS 204 and stored in a deduplicated data pool 216. In some implementations, the data can be replicated via a communication link 214 to the DBSS 204. Replication can be scheduled at a particular time, can be performed automatically, manually, etc. Alternatively, replication can be performed at the earliest possible time in order to minimize a recovery point objective (RPO) time, which corresponds to a measure of how up to date/behind the data stored in the disaster recovery site 203 as compared to the data stored at the primary site 201.

In some implementations, the primary site DBSS 202 can be configured to balance scheduling of various operations that can consume its compute, memory, networking and storage resources. These operations can include backup data ingest (from the backup application media server 210), deduplication (of ingested data), stage out (transmission of data to the deduplicated data pool 208), replication (to the DBSS 204 via link 214), purging of data that is older than a particular backup retention schedule, stage-in (from the deduplicated data pool 208 to the landing zone 206), restore (transmission of data to the backup application media server 210 from the landing zone 206), tape copy (transmission of data for storage from the landing zone 206 to the tape copy 212), and/or any other operations, and/or any combination thereof.

In some implementations, creation of partial and complete images of backups from synthetic backup data can also be performed by the DBSS 202 in addition to the operations above. The DBSS 202 can be configured to implement an adaptive deduplication scheme that can ensure that the backup ingest operation is the highest priority operation as compared to the other operations performed by the DBSS 202, which can minimize the backup window. The remaining operations can be performed at a lower priority. Alternatively, the DBSS 202 can be configured to assign various priorities to each of its operations to ensure operational efficiency, minimization of consumption of compute resources, RPO, backup window, etc.

Figure 3:
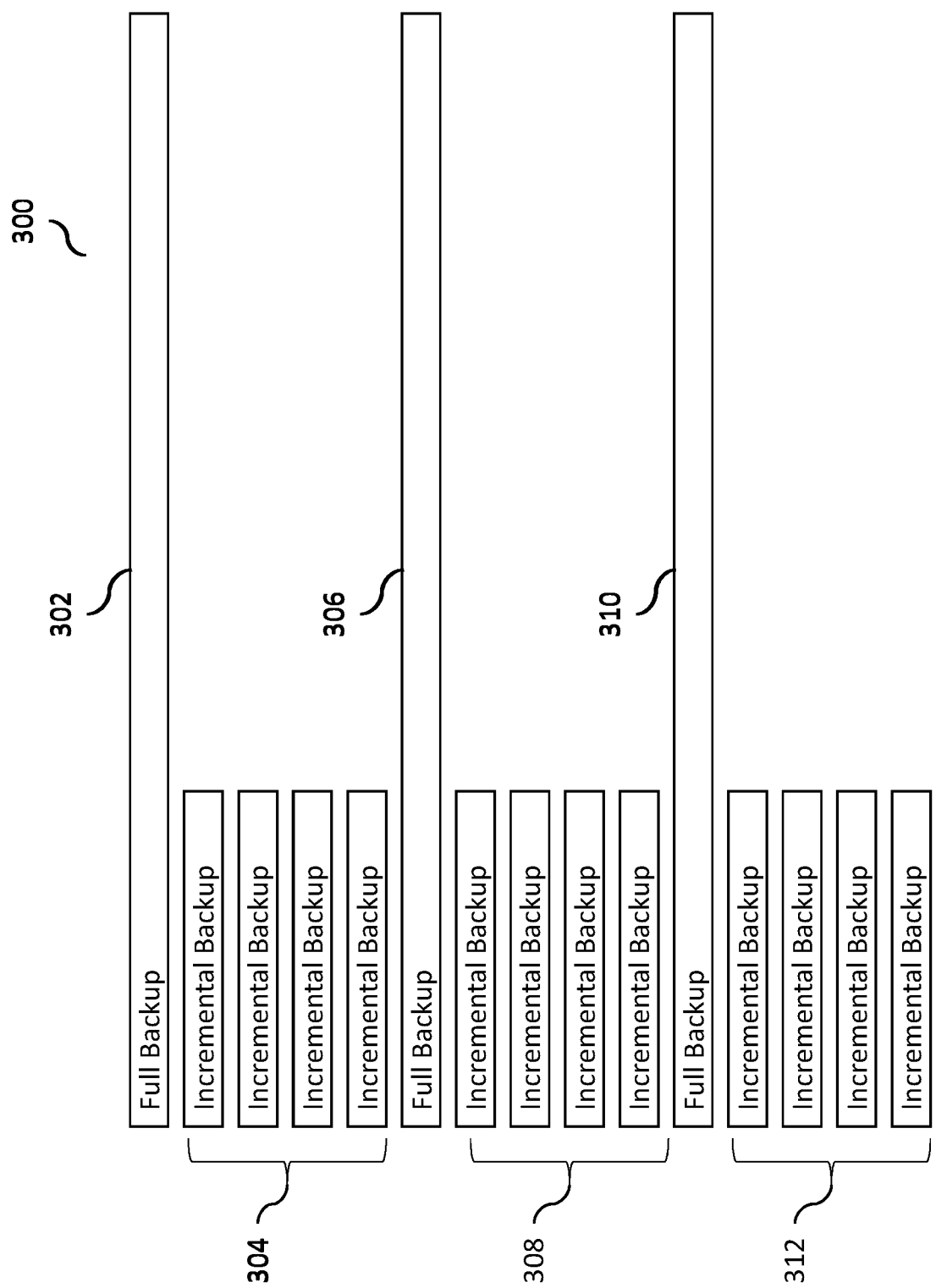
FIG. 3 illustrates an exemplary backup timeline.

FIG. 3 illustrates an exemplary backup timeline 300. The backup timeline 300 is a vertical timeline from top to bottom of a typical backup schedule. A full backup 302 is performed starting on at a particular time (e.g., a Friday evening) and all backup client data can be copied to a backup storage location. This operation is most time consuming because of the amount of data that must be transferred and stored. Typically, if all backup data is copied on Friday evening, only changes in data for each backup client are sent to the backup storage location on Monday, Tuesday, Wednesday and Thursday evenings as incremental backups 304. The process can be repeated every Friday night or at any other time (e.g., full backup 306 and incremental backups 308, followed by full backup 310 followed by incremental backups 312). This process describes a typical weekly backup schedule. In addition, monthly and yearly full backups can be optionally scheduled.

The backup application can allow a backup administrator to define a retention period for backup client data. The backup storage location's deduplicated data pool can maintain data for the defined retention period. The backup application can manage the retention period and can instruct the backup storage location to delete files that are older than the retention period.

Figure 4:
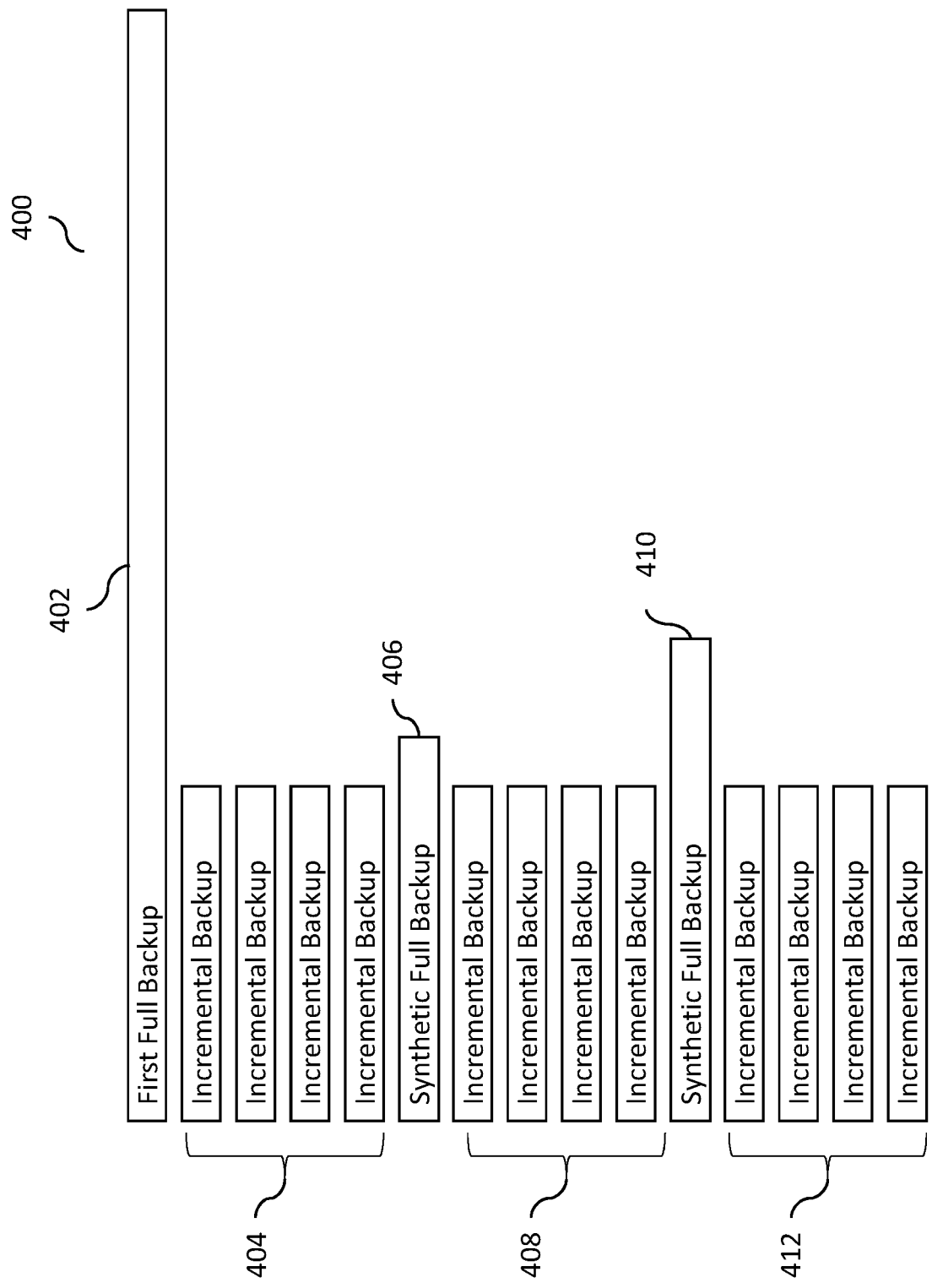
FIG. 4 illustrates an exemplary backup timeline that implements use of synthetic backups, according to some implementations of the current subject matter.

FIG. 4 illustrates an exemplary backup timeline 400 that implements use of synthetic backups, according to some implementations of the current subject matter. In the timeline 400, full backups (e.g., weekly full backups) can be replaced by synthetic full backups. A synthetic full backup can run almost as quickly as an incremental backup and much faster than a traditional full backup. As shown in FIG. 4, the first full backup 402 can be performed initially and can be followed by incremental backups 404, which, in turn, can be followed by a sequence of a synthetic backup 406 and incremental backups 408, and then followed by a sequence of a synthetic backup 410 and incremental backups 412, etc. A synthetic full backup can combine data from the latest full backup or a synthetic full backup together with any subsequent incremental backups into a single file. This is performed instead of reading and backing up data directly from a client (which does not impose any load on the client). During a synthetic full backup, a list of objects scanned by the previous backup can be used to read the same objects from storage and the latest version of each object is found.

While the synthetic full backup reduces network traffic between backup clients, backup application media servers and the DBSS, and also reduces the amount of data storage consumed on the DBSS, the synthetic full file can be a poor format to retain in the landing zone of a DBSS. For example, use of the synthetic full file can make restore operations and/or tape copy operations extremely slow and time-consuming. Additionally, a significant amount of metadata must be maintained in order to track all of the synthetic full file pointer references to other backup files. To address these problems, the current subject matter can be configured to perform re-synthesis, which is a process of converting a synthetic full backup into a traditional full backup.

Figure 5:
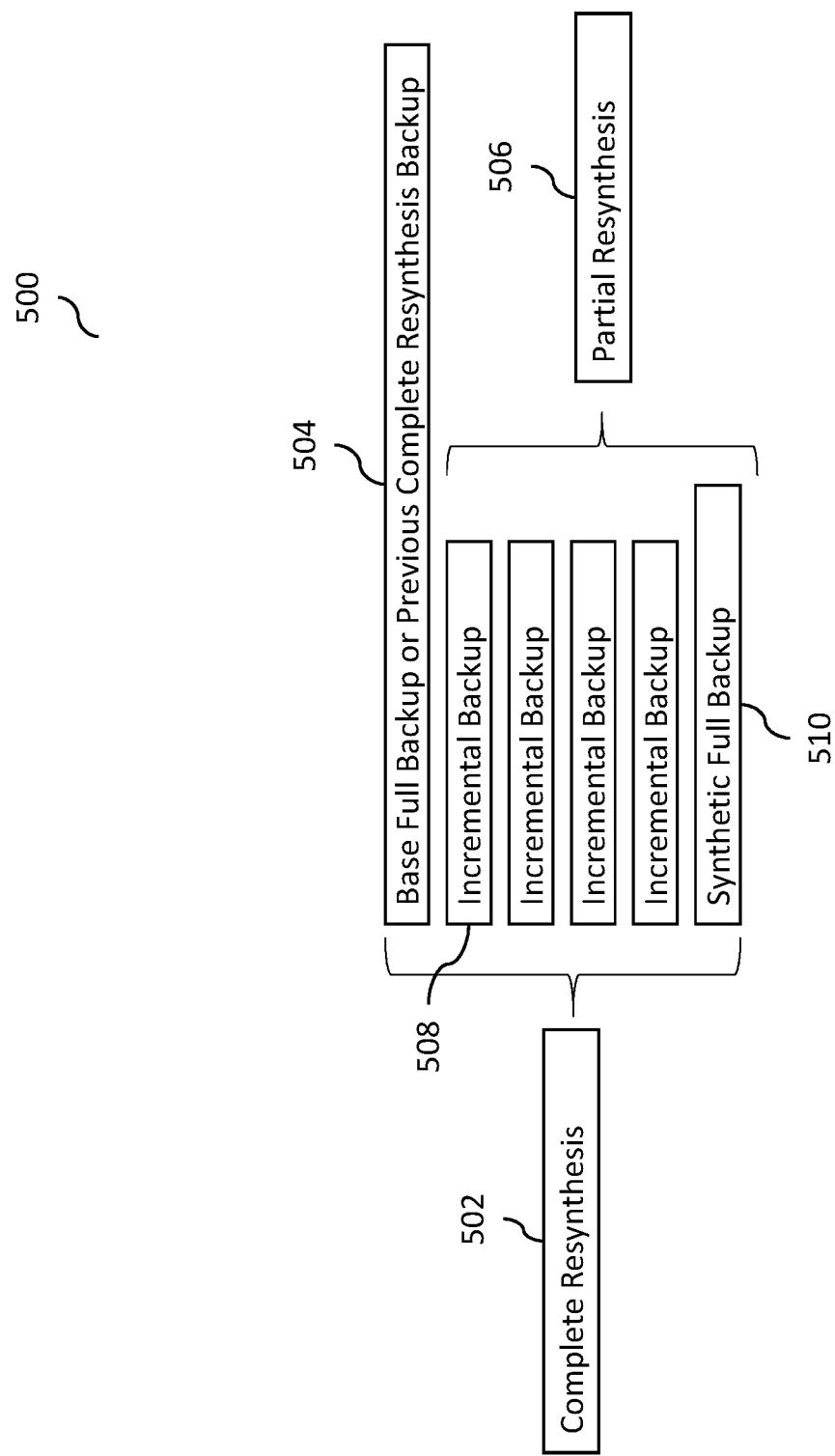
FIG. 5 illustrates an exemplary re-synthesis process, according to some implementations of the current subject matter.

FIG. 5 illustrates an exemplary re-synthesis process 500, according to some implementations of the current subject matter. The process can be performed at the DBSS 202 as shown in FIG. 2. The re-synthesis can include a complete re-synthesis 502 and/or a partial re-synthesis 506. The complete re-synthesis 502 can encompass a base full backup and/or a previous complete re-synthesis backup 504 along with incremental backups 508 and/or a synthetic full backup 510. During the backup processes 502 and 504, data can be included using INCLUDE and NEW references (or instructions, identifiers, pointers, functions, metadata, etc.). The INCLUDE reference can be configured to indicate that data from one or more previous backup operations needs to be included in the current backup. For example, a processor encountering the INCLUDE reference can analyze the reference to determine what physical data is required to be included as well as in which storage location it is stored. Based on this information, the processor can be configured to perform retrieval of appropriate physical data, for example. The NEW reference can be configured to indicate that the data that has been sent for backup has not been in the previous backups and is a new data that requires backup. In some implementations, the INCLUDE and/or NEW references can also indicate a location where data needs to be inserted (e.g., a byte offset).

In some implementations to perform complete re-synthesis 502, the DBSS 202 can be configured to merge the latest synthetic full image 504 with the previous incremental backups 508 and full/synthetic backups 510. This can incur a significant amount of disk input/output (I/O) activity. As stated above, this process replaces data identified by the INCLUDE reference (INCLUDE data) with data from the previous base/synthetic full backup. Complete re-synthesis 502 can be configured to trade-off the lower performance of the re-synthesis operation for the higher performance of future restore requests.

In some implementations, a partial re-synthesis backup can encompass merger of the latest synthetic full image 510 with the previous incremental backups 508, but not the prior base or synthetic full image 504. A partial re-synthesis operation 506 can be configured to run faster than the complete re-synthesis process 502 since it does not require that all of the INCLUDE references from the previous base/synthetic full be resolved (i.e., all data from previous backup 504 is included), thereby saving disk I/O data transfer. While the partial re-synthesis operation 506 is faster and more efficient to execute, efficiency can be reduced and data restore execution times can be higher, than if the complete re-synthesis operation 502 was performed on that same data.

Figure 6:
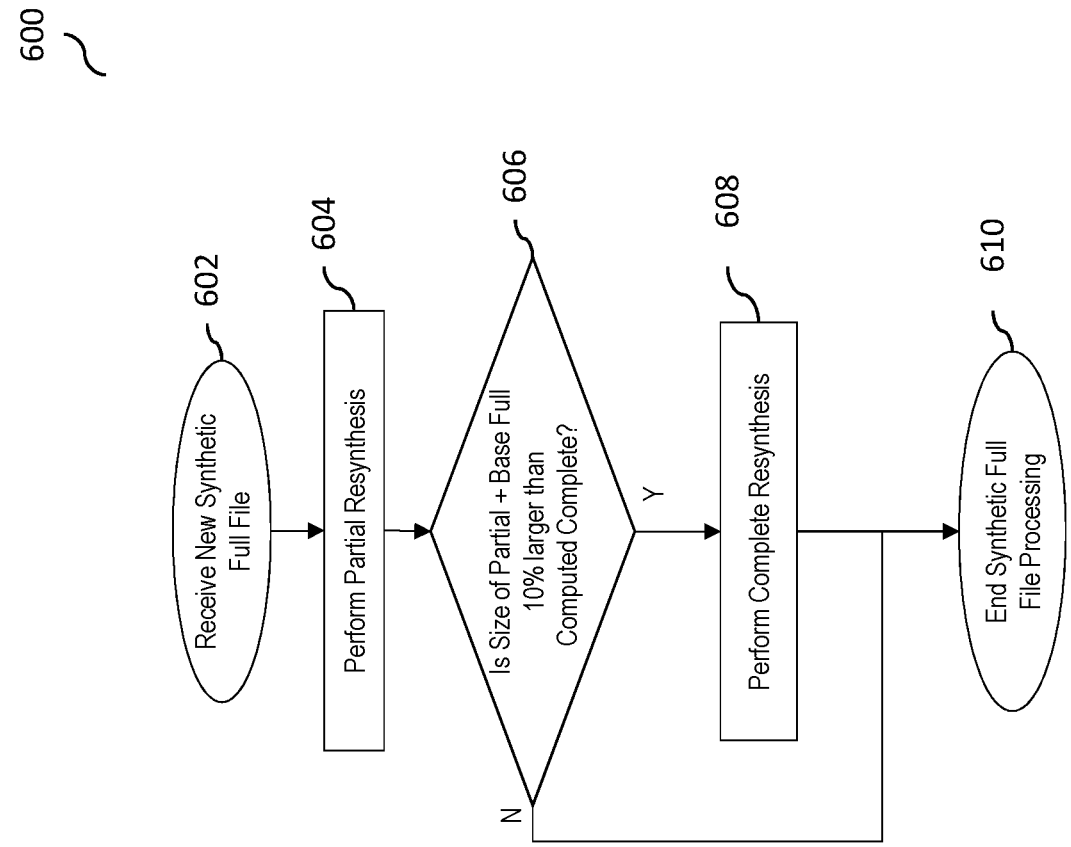
FIG. 6 is a flowchart illustrating an exemplary process for performing a backup operation, according to some implementations of the current subject matter.

FIG. 6 is a flowchart illustrating an exemplary process 600 for performing a backup operation, according to some implementations of the current subject matter. During process 600, the DBSS 202 (shown in FIG. 2) can be configured to determine whether to perform a complete or partial re-synthesis operation. At 602, a new synthetic full backup file is received by the DBSS 202. At 604, a partial re-synthesis operation 506 (shown in FIG. 5) can be performed. In some implementations, in all re-synthesis operations, a partial re-synthesis operations can be performed first. Alternatively, a complete re-synthesis operation 502 (shown in FIG. 5) can be performed first. At 606, the DBSS 202 can be configured to determine whether the combined size of data in partial and base full backups 508, 510 is greater than a computed complete re-synthesis backup file 502. This can be accomplished by comparing the number of bytes in the combined partial and base full backups 508, 510 to the number of bytes in the complete re-synthesis backup file 502. In some exemplary implementations, if the combined size of the backups 508, 510 is greater than a predetermined number of bytes (e.g., percentage (e.g. >10%)) of a complete re-synthesis image 502, the complete re-synthesis operation 502 can be performed, at 608. Otherwise, the synthetic full file processing can be terminated, at 610. As can be understood, the above predetermined number of bytes or percentage can be set at any level and can depend on any of the factors identified above in connection with efficient operation of the DBSS 202 (shown in FIG. 2).

Figure 7:
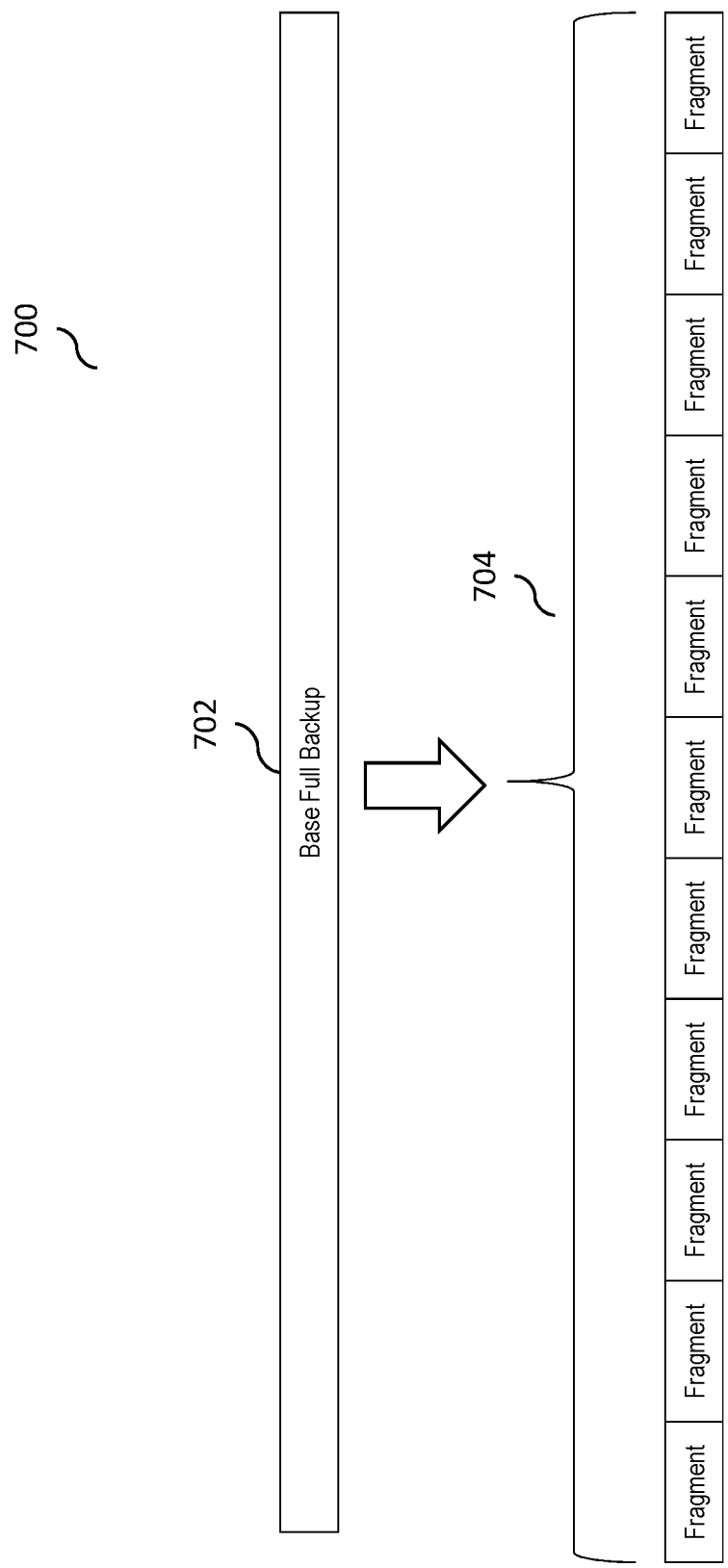
FIG. 7 illustrates an exemplary a backup file including its contents, according to some implementations of the current subject matter.

FIG. 7 illustrates an exemplary a backup file 700 including its contents, according to some implementations of the current subject matter. In particular, FIG. 7 shows how a first/base full backup file 702 can be logically divided into fixed-length physical fragments 704. The backup 702 can include any number of fragments or segments 704, each of which can have the same or different sizes.

For base/full backups, each physical fragment 704 can include an exact number of bytes. The size of each fragment 704 can be configured automatically, manually, by a backup administrator, set by a backup application algorithm, and/or using any other ways, and/or any combination thereof. Base full backup images can be large in size, e.g., tens of terabytes. In some implementations, a size of a physical fragment 704 can be set to create a plurality of fragments within the full backup image 702, e.g., dozens to hundreds of fragments of the original backup file. For example, a 10 TB backup file can have approximately 80 physical fragments having a size of 128 gigabyte (GB). Configuring the physical fragment size to a smaller value can allow for more parallelism in partial/complete re-synthesis process tasks and can also provide more granularity in staging out data from the DBSS landing zone 206 (shown in FIG. 2) once a fragment is processed.

Figure 8:
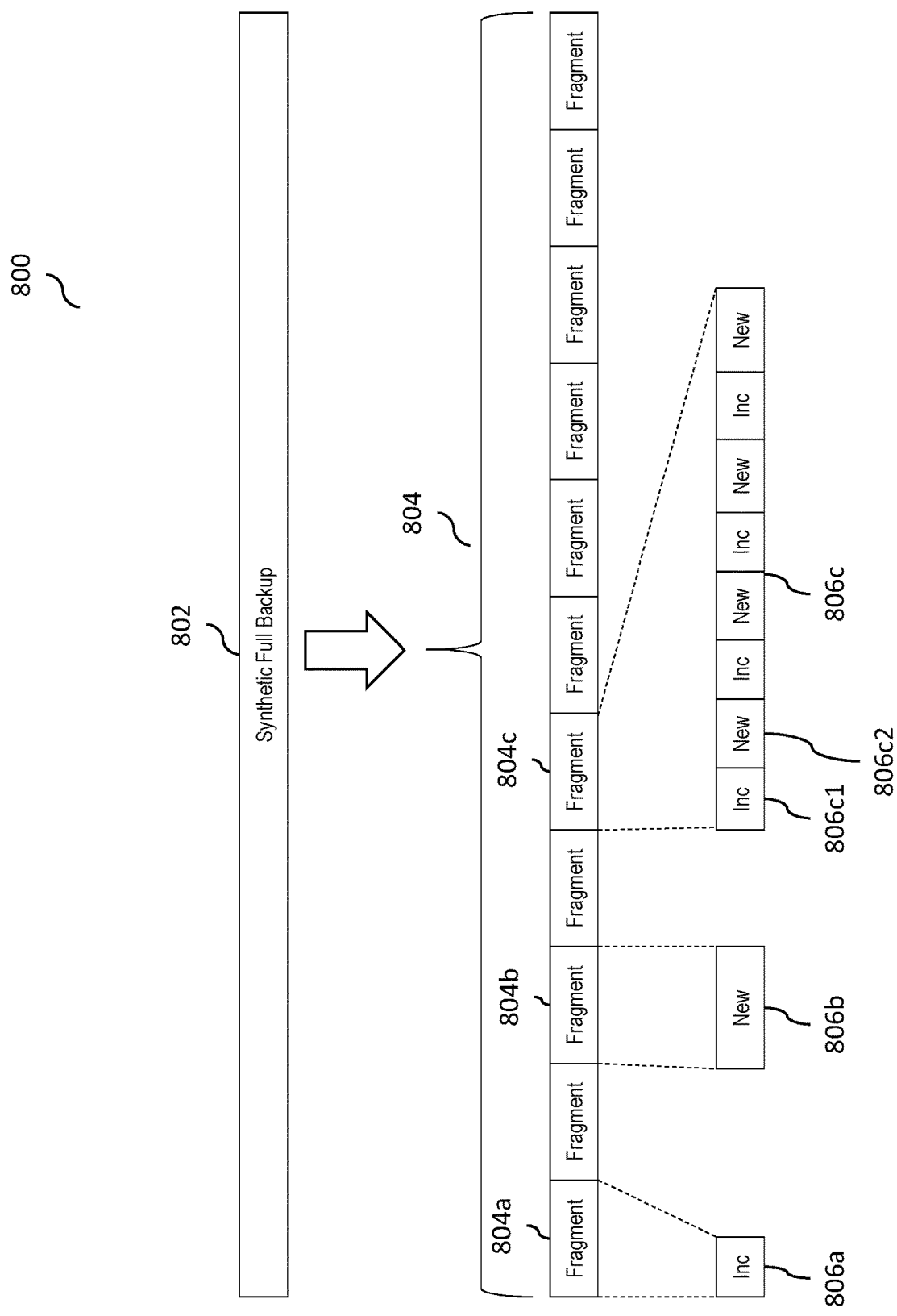
FIG. 8 illustrates an exemplary system for backup of data, according to some implementations of the current subject matter.

FIG. 8 illustrates an exemplary system 800 for backup of data, according to some implementations of the current subject matter. The system 800 illustrates a synthetic full backup 802 that includes a plurality of fragments 804 (a, b, c). The fragment 804 can be a virtual fragment of the synthetic full backup 802. The virtual fragments 804 can represent the data that was in a corresponding physical fragment, however, the virtual fragments do not typically contain the number of physical bytes that were in the corresponding physical fragment. The virtual fragments 804 can have different sizes and can include one or more INCLUDE and/or NEW references 806 (a, b, c1, c2) that can point a location of a physical data that may need to be included from a previous backup (i.e., INCLUDE reference) and/or a new data (i.e., NEW reference). The references within a fragment 804 can be arranged in any number of ways to ensure accurate backup and/or restoration of a particular physical fragment corresponding to the virtual fragment 804.

As shown in FIG. 8, a virtual fragment 804a can include a single INCLUDE metadata field or a reference 806a that can indicate that the entire content of this virtual fragment is an exact copy of a range of bytes from previously backed-up data. For example, the virtual fragment 804a can be a few bytes long, since it only has to contain metadata identifying location of the matching bytes can be found among other previously backed up data.

A virtual fragment 804b can include an entirely new data. In this case, all new data bytes can be included within the virtual fragment 804a as well as a few additional bytes corresponding to the NEW reference 806b, which indicate that this is a new data as opposed to the previously backed-up data (which would be indicated by the INCLUDE bytes).

A virtual fragment 804c can include a sequence 806c of INCLUDE and/or NEW references to reflect that some bytes of the virtual fragment 804c can be included (i.e., reference 806c1) or are not included (i.e., a reference 806c2) within previous backup files, respectively. As can be understood any combination of INCLUDE and/or NEW references can be included within a fragment 804.

During a partial or complete re-synthesis operation, virtual fragments 804 of the synthetic full file 802 can be processed in sequence, randomly and/or in parallel. If processed in parallel, the number of concurrent virtual fragment re-synthesis operations can be managed to ensure that all processing and storage I/O capability of the DBSS 202 is not consumed, and hence, can be throttled accordingly. Typical system metrics like CPU utilization, consumed memory, disk storage bandwidth, etc. can provide the appropriate information for determining whether to throttle up or down re-synthesis operations as well as all other DBSS operations (e.g., deduplication, replication, stage in, stage out, purge, etc.).

Figure 9:
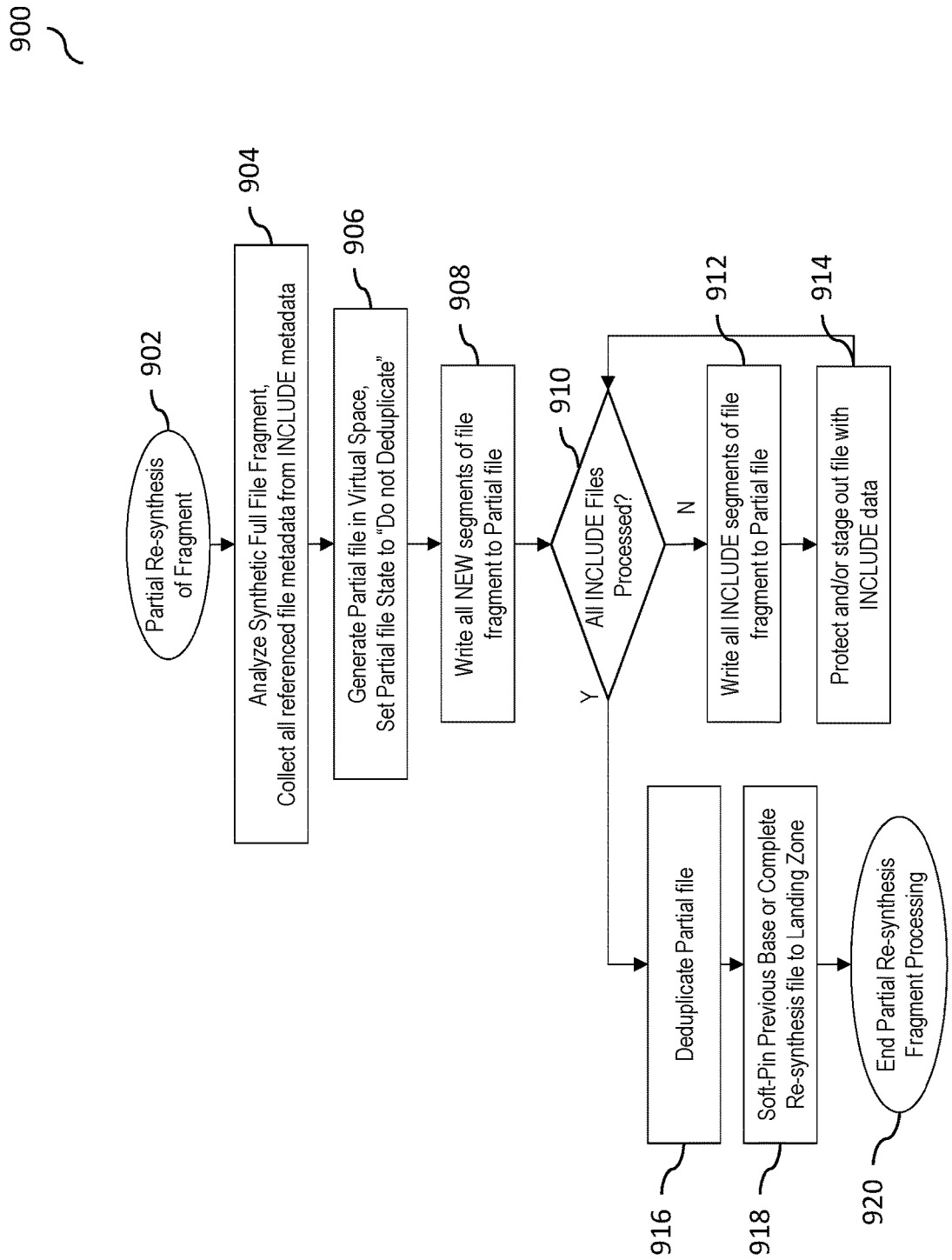
FIG. 9 is a flowchart illustrating an exemplary partial re-synthesis process, according to some implementations of the current subject matter.

FIG. 9 is a flowchart illustrating an exemplary partial re-synthesis process 900, according to some implementations of the current subject matter. The process 900 can be performed concurrently across multiple virtual fragments 804 of the synthetic full backup file 802 (shown in FIG. 8). At 902, a synthetic full file fragment can be received at DBSS 202 (as shown in FIG. 2). At 904, the content of the synthetic full file fragment can be reviewed/examined and all INCLUDE references/instructions can be resolved (i.e., a determination is made where physical data corresponding to each INCLUDE reference/instruction is stored) to generate a list of all previously backed up files that contain the replacement bytes (i.e., physical data bytes to replace virtual bytes of the INCLUDE instructions).

At 906, a partial re-synthesis file can be generated in a virtual space, and a file attribute called "Do not Deduplicate" can be set to prevent this file from being deduplicated to the deduplicated data pool 208 of the DBSS 202 (as shown in FIG. 2). In some implementations, this attribute can be set by DBSS 202 and/or any other computing component. For example, any data that has been previously deduplicated and may have been stored in a repository may have an attribute "Do not Deduplicate" set and/or associated with it. The data having "Do not Deduplicate" attribute may be transmitted from the repository to the landing zone. In some implementations, various data (whether or not contained in the landing zone and/or a repository) that may or may not have been deduplicated may also include a "Do not Deduplicate" attribute associated with it. At 908, all NEW references from the synthetic file can be written to a new partial re-synthesis file. Once complete, the list of files specified in the INCLUDE metadata of the synthetic full fragment can be processed to restore data into the right byte offset (i.e., location of where physical data bytes should be placed) of the partial re-synthesis file. As each INCLUDE reference is processed, the data corresponding to the INCLUDE reference can be set to be staged out of the landing zone 206 of the DBSS 202 (as shown in FIG. 2).

At 910, the DBSS 202 can determine whether all INCLUDE file references have been processed. If so, at 916, the partial re-synthesis file can be scheduled to be deduplicated and the results can be stored in the DBSS deduplicated data pool 208 (as shown in FIG. 2).

In some implementations, it may be important to retain both the base backup file along with the partial re-synthesis file since they would both be required to satisfy a future potential restore request. A typical stage out policy can be configured to delete files from the landing zone 206 that are the oldest (e.g., using date/time, etc. associated with a file), unless a file has a soft-pin attribute set that may prevent it from being deleted. At 918, since the base file is to remain stored in the landing zone 206, a "soft-pin" attribute can be generated and associated with that base file to allow it to be retained or stored in the landing zone 206 regardless of age. In some implementations, the "soft-pin" attribute can be removed or reset and the file can be staged out/deleted, etc. when this particular base backup file is no longer needed for restore operations. The soft-pin can be removed, for example, when the next partial or complete re-synthesis operation is performed. In some exemplary implementations, the soft-pin attribute removal can also be dependent on DBSS 202 monitoring of its processes, specific elapsed time, etc. and/or any other factors, and/or any combination thereof. Referring back to FIG. 9, at 920, the partial re-synthesis process of fragments can be terminated.

If at 910, the DBSS 202 determines that not all INCLUDE file references have been processed, all INCLUDE segments of a particular fragment can be written to the partial re-synthesis file, at 912. Then, at 914, the file with all INCLUDE data can be protected/stored and/or staged out. The process can then return to 910 to check whether all INCLUDE file references have been processed.

Figure 10:
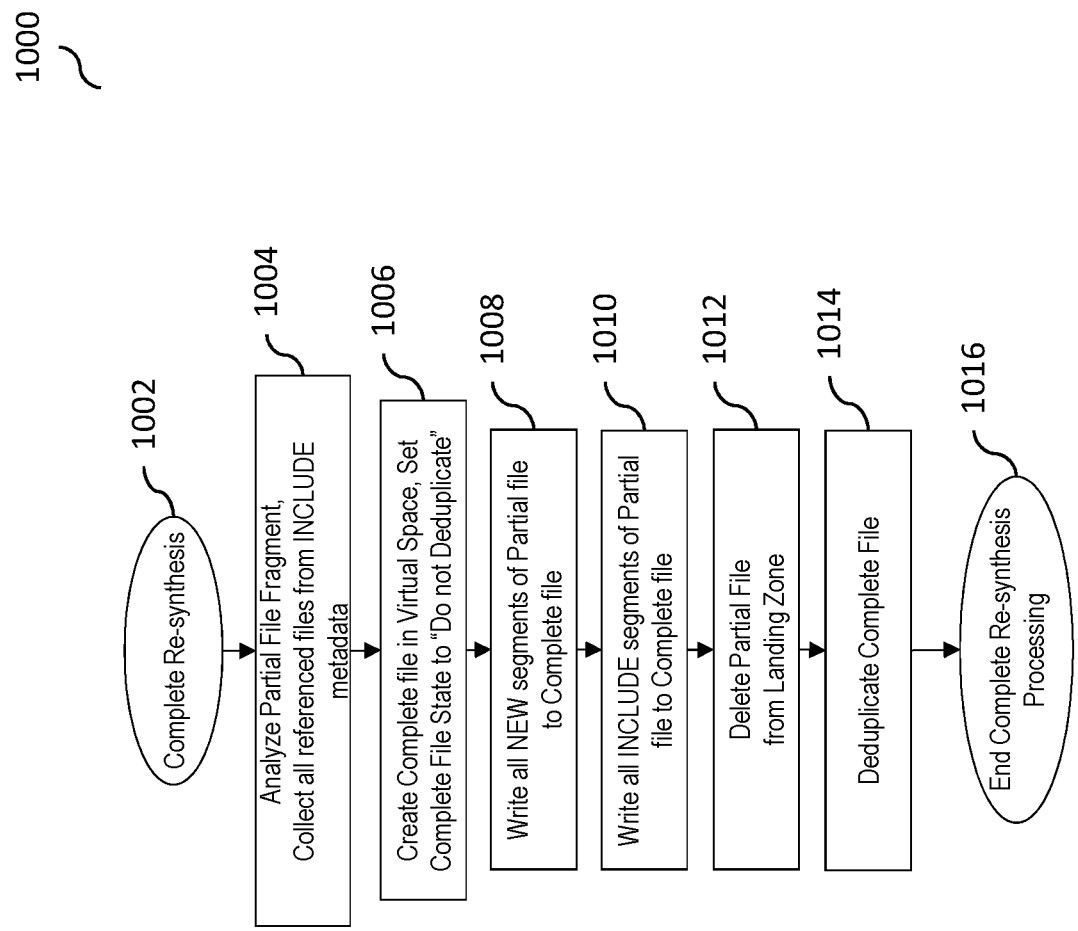
FIG. 10 is a flowchart illustrating an exemplary complete re-synthesis process 1000 for performing a backup, according to some implementations of the current subject matter.

FIG. 10 is a flowchart illustrating an exemplary complete re-synthesis process 1000 for performing a backup, according to some implementations of the current subject matter. In some implementations, a complete re-synthesis operation can be preceded by a partial re-synthesis operation. In some implementations, the complete re-synthesis process 1000 can resolve any remaining INCLUDE fields in the partial backup file that reference the previous base/synthetic full backup. At 1002-1004, complete re-synthesis process can be initiated and/or a partial file fragments can be analyzed and all referenced files from INCLUDE metadata can be collected. At 1006, a complete re-synthesis file can be generated in a virtual space. A "Do not Deduplicate" identifier/tag/state can be associated with the generated complete re-synthesis file. At 1008, all NEW segments from the partial re-synthesis file can be written to the generated new complete file. At 1010, the list of INCLUDE metadata of the partial file can be processed to restore the data into the right byte offset of the generated complete file. Once all INCLUDE references are processed from the partial file, the partial file can be deleted from landing zone 206, at 1012. At 1014, the generated complete file can be scheduled for deduplication, thereby terminating the complete re-synthesis process, 1016.

In some implementations, the current subject matter can provide one or more of the following exemplary advantages. The below advantages can be accomplished using one or more processes described above. For example, the current subject matter can allow a backup application to send backup data files to the DBSS without ingest operations being negatively performance-impacted by other DBSS data management processes, thereby making backup ingest operation the highest priority operation. An ingest operation (i.e., accepting data from one or more application for backup and/or other backup-related operations) can be assigned highest priority in terms of designation of compute resources (e.g., I/O, memory, processors, etc.). In some implementations, DBSS data management system may be configured to assign highest priority to restore processes, tape copy processes, and/or full/incremental backup processes. Lower priority may be assigned to deduplication, purging, and/or distance recovery procedures (e.g., disaster recovery site replication processes). In some implementations, it may not be necessary to adaptively manage synthetic backup processes (e.g., synthetic full backup processes) as the backup streams that are being ingested may be relatively small, whereby the re-synthesis processes might not affect synthetic backup operations.

In some implementations, the current subject matter may be configured to apply adaptive deduplication process rules to one or more operations performed in connection with synthesis processes disclosed herein. In particular, if the current subject matter system is executing one or more of the backup ingestion and/or copy to tape processes, the deduplication and/or purging processes may be throttled up to ensure that there is available storage space (e.g., in the landing zone) to accept ingested backup data and/or data for performing a copy to tape processes.

Any re-synthesis processes may be performed irrespective of the deduplication and/or purging processes, e.g., both types may be executed at full speed. However, execution of the re-synthesis processes may be slowed down and/or stopped if restore and/or copy-to-tape processes are being executed. This is done so that the deduplication and purging activities may be throttled up. Any re-synthesis processes may continue executing while synthetic backups are being written to the current subject matter system. The synthetic backups typically consume less bandwidth than traditional backups, because only changes are being transmitted for backup. This is further advantages because it can allow the current subject matter to perform post-processing of synthetic full backup files in order to create full backup files that can optimize performance of a later restore and/or tape copy operations as well as leveraging the DBSS "landing zone" as a disk-based area from which synthetic full backup files can be converted into traditional full backup files as part of a re-synthesis operation. Moreover, assigning of priorities to various processes performed by the current subject matter system can be configured to prioritize staging out of full, synthetic full and/or incremental backup files from the landing zone that have been completely processed by the re-synthesis operation in order to optimize the landing zone storage space.

In some implementations, the current subject matter may be configured to have the following additional advantages and technical benefits. When performing a re-synthesis operation, the current subject matter can process multiple virtual fragments in parallel. It can also use a "complete re-synthesis" operation to generate a full backup image that has no dependencies on any other backup images. Further, the current subject matter can determine whether to restrict the re-synthesis operation to only a "partial re-synthesis" operation if the effect on the landing zone space incurred by the partial re-synthesis operation is minimal. Soft-pinning the base full file (as part of partial re-synthesis) can allow it to remain in the landing zone area with the partial file for fastest future restores and tape copies. Additionally, the current subject matter can

- deduplicate and/or replicates complete and/or partial re-synthesis backup files from the primary site DBSS to one or more remote site DBSS once they are generated;
- allow the deduplication ratio for a full re-synthesis backup file to be the same as the deduplication ratio for a traditional full backup (whereby raw synthetic full backup files themselves typically deduplicate poorly since they contain mostly changed/new data); and
- allow coordinated deletion of files that are no longer required to be maintained at both the primary site and all disaster recovery sites (e.g., many installations of the DBSS can operate replica repositories at one or more remote sites in order to recover from a primary site disaster).

Figure 11:
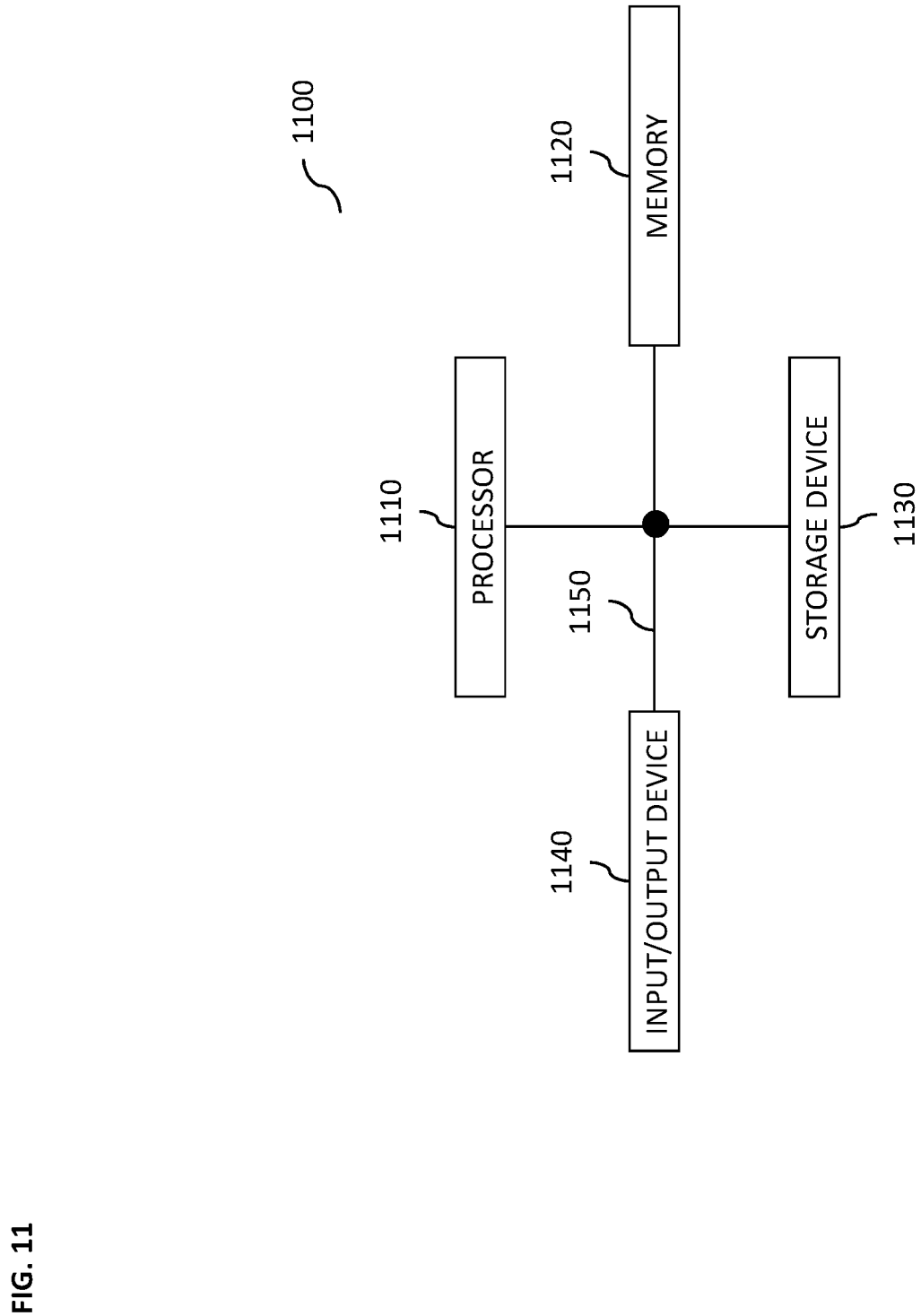
FIG. 11 illustrates an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
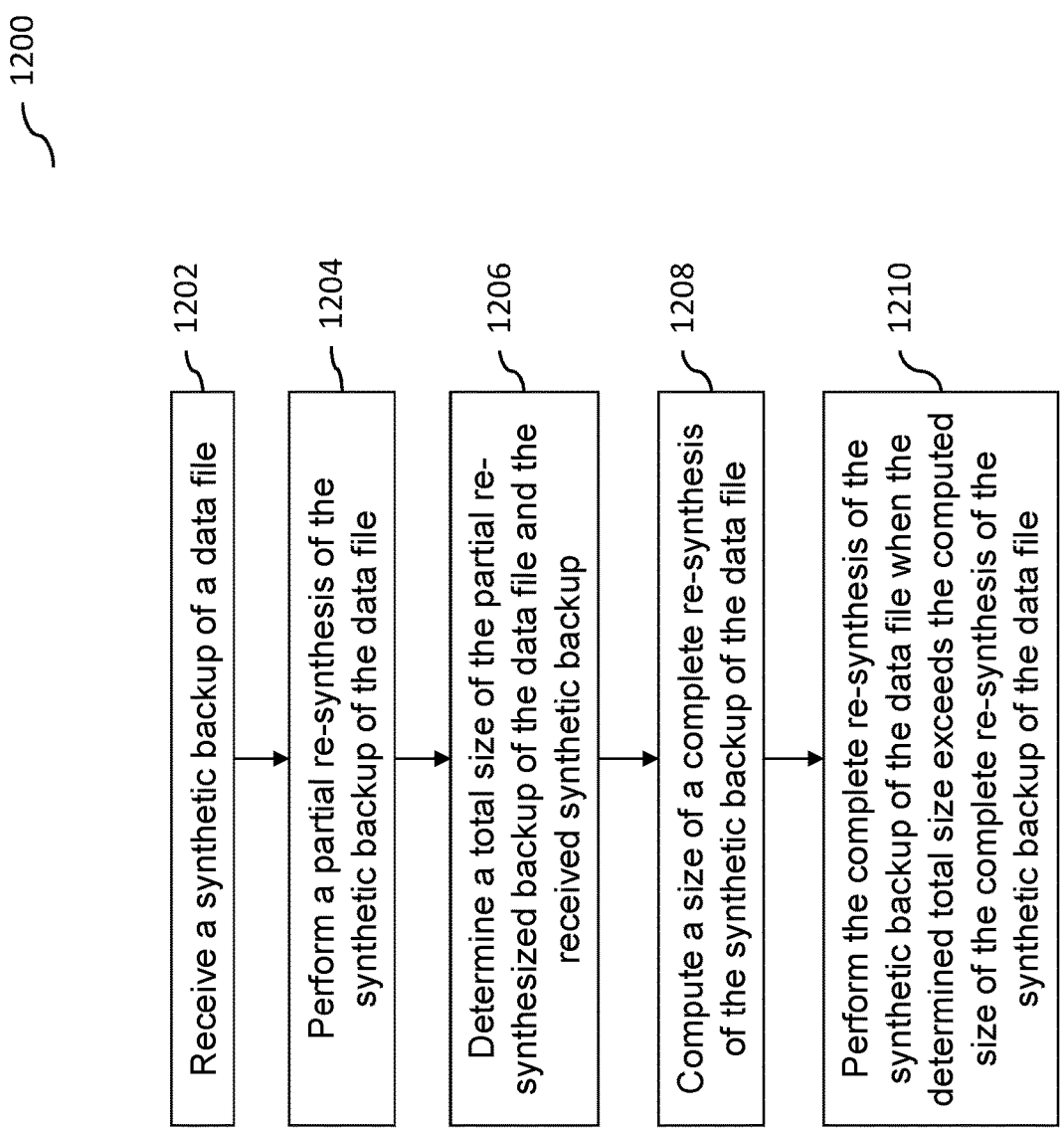
FIG. 12 illustrates an exemplary method, according to some implementations of the current subject matter.

FIG. 12 illustrates an exemplary method 1200, according to some implementations of the current subject matter. At 1202, a synthetic backup of a data file can be received. At 1204, a partial re-synthesis of the synthetic backup of the data file can be performed. At 1206, a total size of the partial re-synthesized backup of the data file and the received synthetic backup can be determined. At 1208, a size of a complete re-synthesis of the synthetic backup of the data file can be computed. At 1210, the complete re-synthesis of the synthetic backup of the data file can be performed when the determined total size exceeds the computed size of the complete re-synthesis of the synthetic backup of the data file.

In some implementations, the current subject matter can include one or more of the following optional features. The synthetic backup of the data file can include a plurality of virtual fragments. Each virtual fragment in the plurality of virtual segments can include at least one instruction in a plurality of instructions identifying a physical data fragment for inclusion in at least one of the partial re-synthesized backup of the data file and the complete re-synthesized backup of the data file. The instruction can include at least one of the following: a first instruction identifying a physical segment from a previous backup of the data file for inclusion and a second instruction identifying a physical data segment that has not been backed-up previously.

In some implementations, the method can further include, using the plurality of instructions in the plurality of virtual fragments, combining physical data segments identified by the plurality of instructions, and generating, based on the combined physical data segments, at least one of the partial re-synthesized backup of the data file and the complete re-synthesized backup of the data file.

In some implementations, the partial re-synthesized backup of the data file can be generated based on a combination of at least one incremental backup performed after the received synthetic backup of the data file and another synthetic full backup performed after the at least one incremental backup.

In some implementations, the complete re-synthesized backup of the data file can be generated based on a combination of the received synthetic backup of the data file, at least one incremental backup performed after the received synthetic backup of the data file and another synthetic full backup performed after the at least one incremental backup. The received synthetic backup can include at least one of the following: a full backup of the data file and previous complete re-synthesized backup of the data file.

In some implementations, the method can include preventing deduplication of at least one virtual fragment. The method can also include storing the complete re-synthesis of the synthetic backup of the data file in at least one memory location of a deduplication backup storage system.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for performing a backup operation of data by a deduplication backup storage system having a landing zone memory configured to receive backup data from a backup application, comprising:
   receiving, at the deduplication backup storage system, a synthetic full backup of a data file the synthetic full backup of the data file combines data from a previous full backup of the data file and one or more subsequent incremental backups of the data file into a single file;
   performing a partial re-synthesis of the synthetic full backup of the data file, the partial re-synthesis of the synthetic full backup of the data file merges a latest synthetic full backup of the data file with one or more previous incremental backups of the data file;
   determining a total size of the partial re-synthesized backup of the data file and the received synthetic full backup;
   computing a size of a complete re-synthesis of the synthetic full backup of the data file;
   determining whether the total size of data in partial re-synthesized backup of the data file and received synthetic full backup of the data file is greater than the computed size of the complete re-synthesis of the synthetic full backup of the data file; and
   performing the complete re-synthesis of the synthetic full backup of the data file when the determined total size exceeds the computed size of the complete re-synthesis of the synthetic full backup of the data file.

2. The method according to claim 1, wherein the synthetic full backup of the data file includes a plurality of virtual fragments.

3. The method according to claim 2, wherein each virtual fragment in the plurality of virtual segments includes at least one instruction in a plurality of instructions identifying a physical data fragment for inclusion in at least one of the partial re-synthesized backup of the data file and the complete re-synthesized backup of the data file.

4. The method according to claim 3, wherein the at least one instruction includes at least one of the following: a first instruction identifying a physical segment from a previous backup of the data file for inclusion and a second instruction identifying a physical data segment that has not been backed-up previously.

5. The method according to claim 4, further comprising
using the plurality of instructions in the plurality of virtual fragments, combining physical data segments identified by the plurality of instructions; and
generating, based on the combined physical data segments, at least one of the partial re-synthesized backup of the data file and the complete re-synthesized backup of the data file.

6. The method according to claim 1, wherein the partial re-synthesized backup of the data file is generated based on a combination of at least one incremental backup performed after the received synthetic full backup of the data file and another synthetic full backup performed after the at least one incremental backup.

7. The method according to claim 1, wherein the complete re-synthesized backup of the data file is generated based on a combination of the received synthetic full backup of the data file, at least one incremental backup performed after the received synthetic full backup of the data file and another synthetic full backup performed after the at least one incremental backup.

8. The method according to claim 1, wherein the received synthetic full backup includes at least one of the following: a full backup of the data file and previous complete re-synthesized backup of the data file.

9. The method according to claim 2, further comprising preventing deduplication of at least one virtual fragment.

10. The method according to claim 8, further comprising preventing deletion of the received synthetic full backup from at least one memory location of a deduplication backup storage system.

11. The method according to claim 10, wherein the preventing further comprises preventing deletion of the received synthetic full backup for a predetermined period of time.

12. The method according to claim 10, wherein the preventing further comprises preventing deletion of the received synthetic full backup until another synthetic full backup is received in the at least one memory location of the deduplication backup storage system.

13. The method according to claim 1, further comprising storing the complete re-synthesis of the synthetic full backup of the data file in at least one memory location of a deduplication backup storage system.

14. A system for performing a backup operation of data by a deduplication backup storage system having a landing zone memory configured to receive backup data from a backup application, the system comprising:
at least one programmable processor; and
a non-transitory machine-readable medium storing instructions that, when executed by the at least one programmable processor, cause the at least one programmable processor to perform operations comprising:
receiving, at the deduplication backup storage system, a synthetic full backup of a data file, the synthetic full backup of the data file combines data from a previous full backup of the data file and one or more subsequent incremental backups of the data file into a single file;
performing a partial re-synthesis of the synthetic full backup of the data file, the partial re-synthesis of the synthetic full backup of the data file merges a latest synthetic full backup of the data file with one or more previous incremental backups of the data file;
determining a total size of the partial re-synthesized backup of the data file and the received synthetic full backup;
computing a size of a complete re-synthesis of the synthetic full backup of the data file;
determining whether the total size of data in partial re-synthesized backup of the data file and received synthetic full backup of the data file is greater than the computed size of the complete re-synthesis of the synthetic full backup of the data file; and
performing the complete re-synthesis of the synthetic full backup of the data file when the determined total size exceeds the computed size of the complete re-synthesis of the synthetic full backup of the data file.

15. The system according to claim 14, wherein the synthetic full backup of the data file includes a plurality of virtual fragments.

16. The system according to claim 15, wherein each virtual fragment in the plurality of virtual segments includes at least one instruction in a plurality of instructions identifying a physical data fragment for inclusion in at least one of the partial re-synthesized backup of the data file and the complete re-synthesized backup of the data file.

17. The system according to claim 16, wherein the at least one instruction includes at least one of the following: a first instruction identifying a physical segment from a previous backup of the data file for inclusion and a second instruction identifying a physical data segment that has not been backed-up previously.

18. The system according to claim 17, wherein the operations further comprise
using the plurality of instructions in the plurality of virtual fragments, combining physical data segments identified by the plurality of instructions; and
generating, based on the combined physical data segments, at least one of the partial re-synthesized backup of the data file and the complete re-synthesized backup of the data file.

19. The system according to claim 14, wherein the partial re-synthesized backup of the data file is generated based on a combination of at least one incremental backup performed after the received synthetic full backup of the data file and another synthetic full backup performed after the at least one incremental backup.

20. The system according to claim 13, wherein the complete re-synthesized backup of the data file is generated based on a combination of the received synthetic full backup of the data file, at least one incremental backup performed after the received synthetic full backup of the data file and another synthetic full backup performed after the at least one incremental backup.

21. The system according to claim 13, wherein the received synthetic full backup includes at least one of the following: a full backup of the data file and previous complete re-synthesized backup of the data file.

22. The system according to claim 15, wherein the operations further comprise preventing deduplication of at least one virtual fragment.

23. The system according to claim 21, wherein the operations further comprise preventing deletion of the received synthetic full backup from at least one memory location of a deduplication backup storage system.

24. The system according to claim 23, wherein the preventing further comprises preventing deletion of the received synthetic full backup for a predetermined period of time.

25. The system according to claim 23, wherein the preventing further comprises preventing deletion of the received synthetic full backup until another synthetic full backup is received in the at least one memory location of the deduplication backup storage system.

26. The system according to claim 14, wherein the operations further comprise storing the complete re-synthesis of the synthetic full backup of the data file in at least one memory location of a deduplication backup storage system.

27. A computer program product for performing a backup operation of data by a deduplication backup storage system having a landing zone memory configured to receive backup data from a backup application, the computer program product comprising a non-transitory machine-readable medium storing instructions that, when executed by at least one programmable processor, cause the at least one programmable processor to perform operations comprising:
receiving, at the deduplication backup storage system, a synthetic full backup of a data file the synthetic full backup of the data file combines data from a previous full backup of the data file and one or more subsequent incremental backups of the data file into a single file;
performing a partial re-synthesis of the synthetic full backup of the data file, the partial re-synthesis of the synthetic full backup of the data file merges a latest synthetic full backup of the data file with one or more previous incremental backups of the data file;
determining a total size of the partial re-synthesized backup of the data file and the received synthetic full backup;
computing a size of a complete re-synthesis of the synthetic full backup of the data file;
determining whether the total size of data in partial re-synthesized backup of the data file and received synthetic full backup of the data file is greater than the computed size of the complete re-synthesis of the synthetic full backup of the data file; and
performing the complete re-synthesis of the synthetic full backup of the data file when the determined total size exceeds the computed size of the complete re-synthesis of the synthetic full backup of the data file.

28. The computer program product according to claim 27, wherein the synthetic full backup of the data file includes a plurality of virtual fragments.

29. The computer program product according to claim 28, wherein each virtual fragment in the plurality of virtual segments includes at least one instruction in a plurality of instructions identifying a physical data fragment for inclusion in at least one of the partial re-synthesized backup of the data file and the complete re-synthesized backup of the data file.

30. The computer program product according to claim 29, wherein the at least one instruction includes at least one of the following: a first instruction identifying a physical segment from a previous backup of the data file for inclusion and a second instruction identifying a physical data segment that has not been backed-up previously.

31. The computer program product according to claim 30, wherein the operations further comprise
using the plurality of instructions in the plurality of virtual fragments, combining physical data segments identified by the plurality of instructions; and
generating, based on the combined physical data segments, at least one of the partial re-synthesized backup of the data file and the complete re-synthesized backup of the data file.

32. The computer program product according to claim 27, wherein the partial re-synthesized backup of the data file is generated based on a combination of at least one incremental backup performed after the received synthetic full backup of the data file and another synthetic full backup performed after the at least one incremental backup.

33. The computer program product according to claim 13, wherein the complete re-synthesized backup of the data file is generated based on a combination of the received synthetic full backup of the data file, at least one incremental backup performed after the received synthetic full backup of the data file and another synthetic full backup performed after the at least one incremental backup.

34. The computer program product according to claim 26, wherein the received synthetic full backup includes at least one of the following: a full backup of the data file and previous complete re-synthesized backup of the data file.

35. The computer program product according to claim 28, wherein the operations further comprise preventing deduplication of at least one virtual fragment.

36. The computer program product according to claim 34, wherein the operations further comprise preventing deletion of the received synthetic full backup from at least one memory location of a deduplication backup storage system.

37. The computer program product according to claim 36, wherein the preventing further comprises preventing deletion of the received synthetic full backup for a predetermined period of time.

38. The computer program product according to claim 36, wherein the preventing further comprises preventing deletion of the received synthetic full backup until another synthetic full backup is received in the at least one memory location of the deduplication backup storage system.

39. The computer program product according to claim 37, wherein the operations further comprise storing the complete re-synthesis of the synthetic full backup of the data file in at least one memory location of a deduplication backup storage system.

* * * * *